(12) United States Patent
Morishige et al.

(10) Patent No.: US 10,216,936 B2
(45) Date of Patent: Feb. 26, 2019

(54) METHOD OF PREVENTING COMPUTER MALFUNCTION, COMPUTER PROGRAM, AND COMPUTER

(71) Applicant: LENOVO (Singapore) PTE, LTD., New Tech Park (SG)

(72) Inventors: Yusaku Morishige, Fujisawa (JP); Ken Sasaki, Machida (JP); Norihiro Andoh, Tokyo (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 477 days.

(21) Appl. No.: 14/621,708

(22) Filed: Feb. 13, 2015

(65) Prior Publication Data
US 2015/0235029 A1 Aug. 20, 2015

(30) Foreign Application Priority Data
Feb. 15, 2014 (JP) .................. 2014-027059

(51) Int. Cl.
*G06F 21/57* (2013.01)
(52) U.S. Cl.
CPC .................. *G06F 21/572* (2013.01)
(58) Field of Classification Search
CPC .................................................. G06F 11/572
See application file for complete search history.

(56) References Cited

U.S. PATENT DOCUMENTS

| | | | | |
|---|---|---|---|---|
| 8,533,830 B1 * | 9/2013 | Dalcher | ............. | G06F 21/564 713/189 |
| 2012/0066416 A1 * | 3/2012 | Yoshida | ............. | G06F 9/4406 710/26 |
| 2012/0260082 A1 * | 10/2012 | Bobzin | ............. | G06F 21/572 713/100 |
| 2014/0047174 A1 * | 2/2014 | Sakthikumar | ....... | G06F 12/1425 711/105 |
| 2015/0363323 A1 * | 12/2015 | Yu | ............. | G06F 8/65 711/133 |
| 2016/0335071 A1 * | 11/2016 | Ham | ............. | G06F 11/1417 |

FOREIGN PATENT DOCUMENTS

| | | |
|---|---|---|
| CN | 101630353 A | 1/2010 |
| CN | 102693379 A | 9/2012 |
| JP | 2010073193 | 4/2010 |
| TW | 201303636 A1 | 1/2013 |
| WO | 2012/127522 A1 | 9/2012 |

OTHER PUBLICATIONS

Unified Extensible Firmware Interface Specification, Version 2.3.1, Apr. 6, 2011.

* cited by examiner

*Primary Examiner* — Jaweed A Abbaszadeh
*Assistant Examiner* — Sumil M Desai
(74) *Attorney, Agent, or Firm* — Kunzler, PC

(57) ABSTRACT

The malfunction of a system caused by data managed by system firmware is prevented. A firmware ROM 100 is provided with a code area, a default area, and variable areas. Data (CV) fundamental to pre-boot created by a UEFI are written to the variable area. Global variables (GV) defined by the UEFI and data (UV) created by an OS are written to the variable area. The variable area is a recording area capable of being write-locked in the firmware ROM. The UEFI write-locks the variable area after completion of the pre-boot. Thus, the rewriting of CV by the OS can be prevented.

19 Claims, 9 Drawing Sheets

METHOD OF PREVENTING COMPUTER MALFUNCTION, COMPUTER PROGRAM, AND COMPUTER

FIELD

The presented embodiments relate to a technique for preventing computer malfunction, and further to a technique for improving the reliability of booting a computer conforming to a UEFI (Unified Extensible Firmware Interface) specification.

BACKGROUND

Computer firmware is code for providing interfaces between hardware and an operating system (OS), device drivers or high-order programs such as applications. The firmware can be divided into device firmware for exclusively controlling peripheral devices and system firmware (also called platform firmware) involved in the operation of the entire system.

The system firmware is generally stored in a nonvolatile memory (NVRAM) mounted on a motherboard. BIOS is system firmware implemented in many computer systems so far to perform POST (Power On Self Test) and password processing during a period. after the power up of a computer until the start of loading an OS, provide services to access the hardware, and the like However, since it has become difficult for the BIOS to respond to recently advanced hardware, the UEFI Forum has developed UEFI specifications as new system firmware as an alternative to legacy. The UEFI firmware incorporates a mechanism for emulating the legacy BIOS to retain compatibility. Hardware and software have been developed from the legacy BIOS in a step-by-step manner over the past years to be able to respond to the UEFI firmware. The latest version of the UEFI specification was developed in April 2011, and the hardware has been able to be for the most part supported.

In a system with the UEFI firmware mounted therein, both an UEFI-capable OS running in an UEFI native mode and a non-UEFI-compliant OS running in a legacy BIOS compatible mode can operate. Although Windows 7™ supports the UEFI native mode, some functions of the UEFI firmware such as high-speed boot and secure boot cannot be used. In Windows 8™, the full transition to the UEFI firmware is completed to enable the complete use of the functions.

In the UEFI specification, Variable Services, global variables (GV) as variables defined in the UEFI specification are stored in the nonvolatile memory. Most personal computers (PC) today record GV in a nonvolatile memory with a UEFI stored therein. In the UEFI specification, a vendor is allowed to use unique identifiers (VendorGuid and VariableName) for GV defined in the UEFI specification in order to write its own GV in the nonvolatile memory. The OS is also allowed to rewrite GV defined in the UEFI specification.

SUMMARY

The presented embodiments provide a method of preventing system malfunction caused by data managed by system firmware. The data managed by the system firmware is composed of configuration data fundamental to pre-boot, published data defined by the system firmware to be rewritable by an OS, and user data created by the OS. The system firmware records the configuration data in a first variable area of a nonvolatile memory, and records the published data and the user data in a second variable area. The system firmware restricts writing to the first variable area after completion of the pre-boot.

According to such a configuration, when user data are written to the second variable area, the risk of rewriting the configuration data in the first variable area mistakenly by the OS or intentionally by malware can be eliminated, and hence the reliability of the pre-boot can be improved. The restriction on writing to the first variable area can be imposed by write-locking an interface controller for the nonvolatile memory in a hardware manner. The write-lock is so performed that the risk of rewriting the configuration data in the first variable area can be eliminated even if the power supply becomes unstable to generate noise when the system firmware or the OS accesses the nonvolatile memory.

The restriction on writing to the first variable area can also be imposed in a software manner by the system firmware invalidating a request from the OS for updating the configuration data in the first variable area. The system firmware can check the remaining capacity of the second variable area during the pre-boot, display a screen indicating that the second variable area is to be cleaned up when the remaining capacity becomes less than a predetermined value, and erase user data when receiving an instruction for the cleanup. As a result, the second variable area can be prevented from being overflowed with user data so that the writing or updating of published data itself can be prevented from being disabled.

The configuration can also be such that default values of the configuration data and the published data are stored in a third variable area, the configuration data and the published data are compared with the default values during the pre-boot, and the default values can be written to the first variable area or the second variable area when it is determined that either the configuration data or the published data are erased. The default values may be written for erased data alone, or in units of erasure blocks of a flash memory.

When the system firmware conforms to a UEFI specification, the published data can be global variables defined in the UEFI specification. In this case, the UEFI can determine the presence or absence of alteration to parameters related to boot among the global variables recorded in the second variable area during the pre-boot to write the default values when determining that the parameters are altered.

In the UEFI specification, since rewriting to the global variables from the OS and an OS application is permitted, the global variables cannot be write-protected unlike the configuration data. However, if the parameters of global variables related to the boot are kept at the default values, the pre-boot can be made to progress until reaching a setup screen. If the setup screen can be displayed, since a boot disk can be changed or the parameters can be restored to the default values, a user can recover the malfunction.

The global variables related to the boot can be Boot####, BootOrder, Drive####, DriveOrder, and Key####. The parameters in this case can be load options (Load options). The OS can run in a UEFI native mode capable of writing user data freely to the second variable area. The first variable area and the second variable area can be provided in the nonvolatile memory storing the system firmware. In this case, the second variable area can be further divided into an area of recording the published data and an area of recording the user data. Further, the area of recording the published data and the area of recording the user data can be provided in a nonvolatile memory connected to another interface controller different from that of the area of recording the configuration data.

According to the presented embodiments, there can be provided a method of preventing system malfunction caused by data managed by system firmware. According to the presented embodiments, there can also be provided a method of preventing system malfunction caused under an operating environment of an OS running in a UEFI native mode. According to the presented embodiments, there can further be provided a method of preventing the rewriting of CV by an OS and malware. Further, there can be provided a restoration method when GV is rewritten by an OS and malware. Further, there can be provided a computer program and a computer for implementing such a method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

System firmware such as the legacy BIOS or the UEFI firmware needs to refer to data written in a nonvolatile memory accessible immediately after power up in order to perform processing such as the recognition and initialization of devices upon boot up. Hereinafter, data (variables) fundamental to such boot are called configuration variables (CV) in this specification.

CV includes attribute information on a device set by the UEFI at the pre-boot stage and parameters set for the device, the type of device set by a user calling up a setup screen, the operational mode of the device, configuration information indicating the validity/invalidity of the device, and information on the path to a partition in which a boot image is stored and the type of an OS to be loaded. Although many CV have been conventionally recorded in a CMOS using RTC coin batteries to support the power supply, they have also been written to a secure nonvolatile memory storing the UEFI in recent years.

Further, the OS, a UEFI application, and an OS application can write a dump file, such as environment variables for self-customization, a debug log, or an error log, to a non-volatile memory upon execution thereof freely without any restriction on the specifications of the UEFI firmware. Data created by such an OS, a UEFI application, and an OS application are called user variables (UV) in this specification.

Figure 9A:
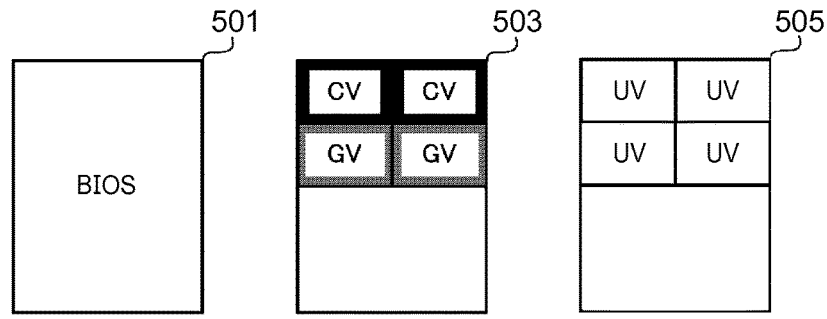
FIG. 9A, FIG. 9B, and FIG. 9C is a diagram for describing a transition of a data recording method managed by the system firmware.

FIG. 9 is a diagram for describing a transition of a data recording method managed by system firmware. FIG. 9A shows a state in which, when the system firmware is the legacy BIOS, BIOS code is stored in a firmware ROM 501, and CV and GV are recorded in a CMOS 503 receiving power support from RTC coin batteries, or in a secure nonvolatile memory. Since the legacy BIOS does not provide services corresponding to the UEFI variable services, UV is recorded in an external storage device 505 such as an HDD or an SSD.

FIG. 9 is a diagram for describing a transition of a data recording method managed by system firmware. FIG. 9A shows a state in which, when the system firmware is the legacy BIOS, BIOS code is stored in a firmware ROM 501, and CV and GV are recorded in a CMOS 503 receiving power support from RTC coin batteries, or in a secure nonvolatile memory. Since the legacy BIOS does not provide services corresponding to the UEFI variable services, UV is recorded in an external storage device 505 such as an HDD or an SSD.

Figures 9B, 9C:
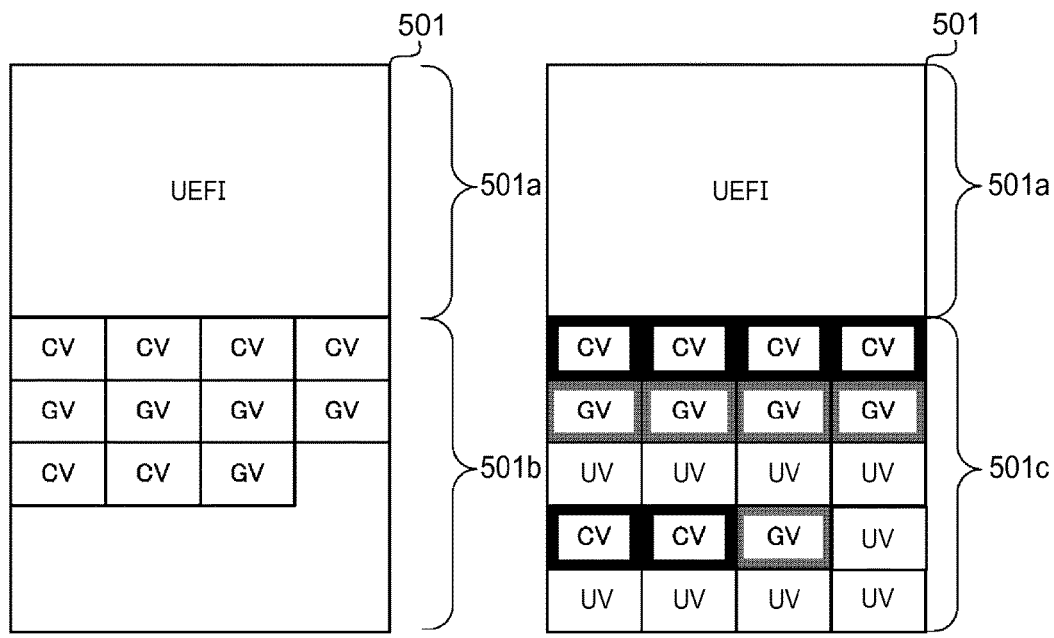

FIG. 9C shows a state in which, when the system firmware is UEFI firmware, a UEFI-capable OS running in the UEFI native mode operates. Since the OS running in the UEFI native mode can use the variable services provided in the UEFI specification, the CV and GV, and a large amount of UV written by the UEFI application, the OS, and an OS application are recorded in the variable area 501c.

Even in either program, there is a need to call SetVariable( ) as a UEFI function and set parameters in order to writedata to the variable area 501c using the variable services. Although the legacy OS running in the legacy BIOS compatible mode cannot use the variable services, since no restriction is imposed on the use of the variable area 501c in the UEFI specification, the OS and the OS application running in the UEFI native mode can write a large amount of UV to the variable area 501c freely using the variable services.

With the full transition of the operating environment of the system firmware from the legacy BIOS to the UEFI to release the variable area 501c to the OS and the OS application, some problems have been revealed in recent years. First, when the OS or the OS application for writing UV sets the variable name (VariableName) or identifier (VendorGuid) of CV or GV in SetVariable( ) by mistake, the CV or GV may be rewritten. Further, the CV or GV is at risk of being rewritten or erased intentionally by malware. The CV is data fundamental to configure the hardware in pre-boot, and the GV also includes data related to the pre-boot. Therefore, when the CV or GV is rewritten by mistake, the system cannot be booted, and this makes difficult recovery work by the user.

Here, the pre-boot means processing performed by the system firmware in an operating environment in which a processor is running the system firmware during a period after power up until the start of loading the OS when the system is in the power-off state (S5 state) or the hibernation state (S4) defined in the ACPI. Further, in this specification, the boot means processing after power up until loading of the OS and the OS application is completed via the pre-boot.

In the UEFI specification, authentication services (Variable Authentication) for hashing parameters to be set in SetVariable( ) to protect writing are provided. Use of the authentication services can prevent the OS or the OS application from overwriting the CV. However, when electrical noise is generated due to instantaneous interruption of the power supply while the OS or the UEFI application is accessing the code area 501c, there is the potential to damage the CV or GV.

Further, in the UEFI specification, since the OS or the OS application is allowed to rewrite the GV, the GV cannot be protected in the authentication services. The GV includes boot-related data on the kind of boot disk and the order of priority by the names of Boot####, BootOrder, Drive####, DriveOrder, and Key####, and data on the path to an input/output console such as Conin or Conout, which are defined in the UEFI specification. If the boot-related data on the GV are rewritten by mistake by the OS or the OS application, or damaged by power-supply noise, it can be expected that boot is disabled.

Further, the capacity of the variable area 501c is far smaller than that of the HDD or the SSD, 16 MB as an example. Therefore, if a large amount of UV is written to make the variable area 501c run out of space, since the UEFI firmware cannot update the CV or GV during the pre-boot, it can be expected that boot is disabled as a result. It can also be expected that the CV or GV is erased by the OS or the OS application for an unexpected cause. In such a case, it is desired to make the pre-boot reach at least up to a setup screen for restoring the CV or GV to the default values or changing the boot disk.

Figure 1:
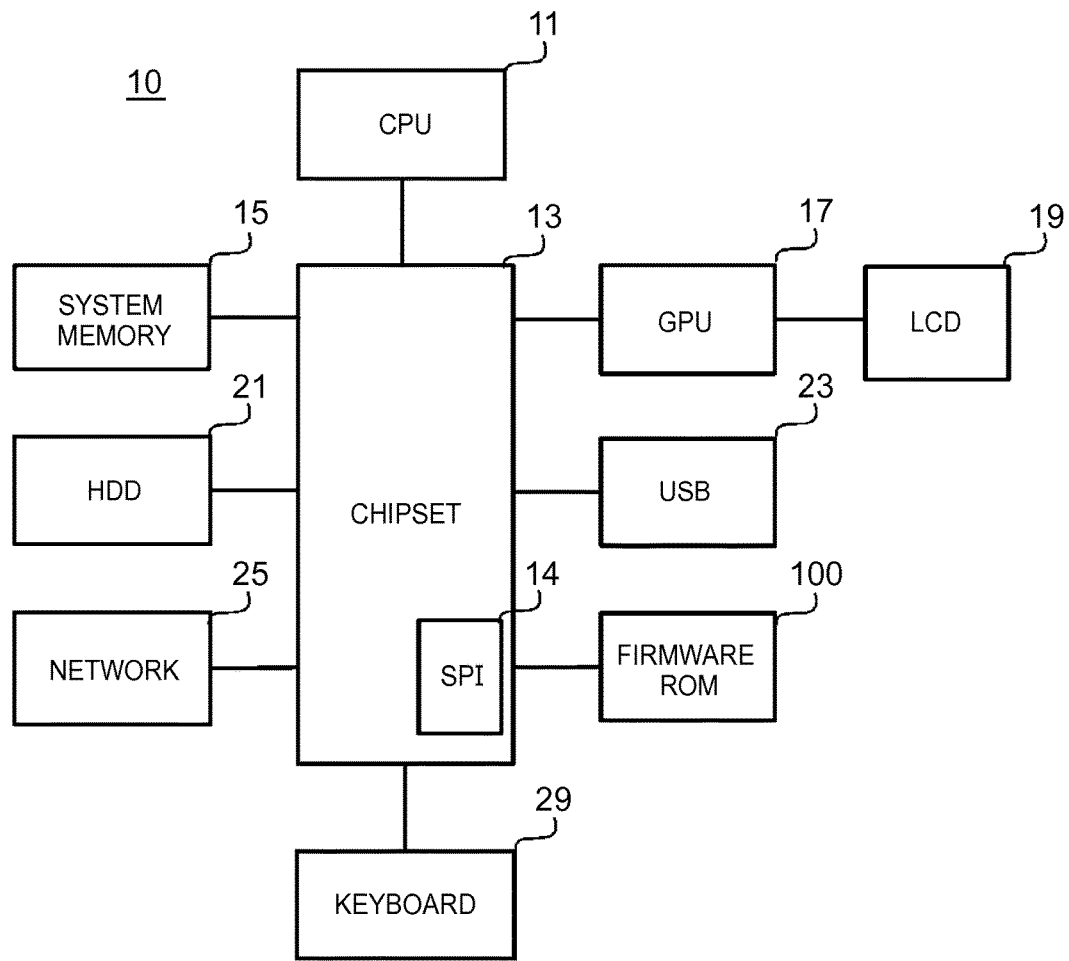
FIG. 1 is a schematic functional block diagram showing the main hardware configuration of a PC 10.

FIG. 1 is a functional block diagram showing the main hardware configuration of a laptop or desktop PC 10. Since the configuration of many hardware components is known, a description will be made of a range necessary to understand the presented embodiments. A chipset 13 has interface functions of various standards, and a CPU 11, a system memory 15, a GPU 17, an HDD 21, a USB connector 23, a network module 25 for connection to a wire or wireless LAN, a keyboard 29, and the like are connected to the chipset 13. An LCD 19 is connected to the GPU 17. A firmware ROM 100 is further connected to an SPI (Serial Peripheral Interface) controller in the chipset 13.

The HDD 21 is a boot disk for storing a boot image of a UEFI-capable OS of the PC 10. The HDD 21 may also store different boot images including a non-UEFI-compliant OS in two or more partitions, respectively. A boot sector of the HDD 21 stores an OS loader for loading the boot image of the OS.

USB devices such as an external USB memory, a USB-CD, a USB-FDD, and a USB-HDD can be connected to the USB connector 23. The PC 10 can be booted from a USB device connected to the USB connector 23 and storing a boot image. The PC 10 can also receive the boot image of an OS via the network module 25 using a PXE (Preboot eXecution Environment) function or the like.

Figure 2:
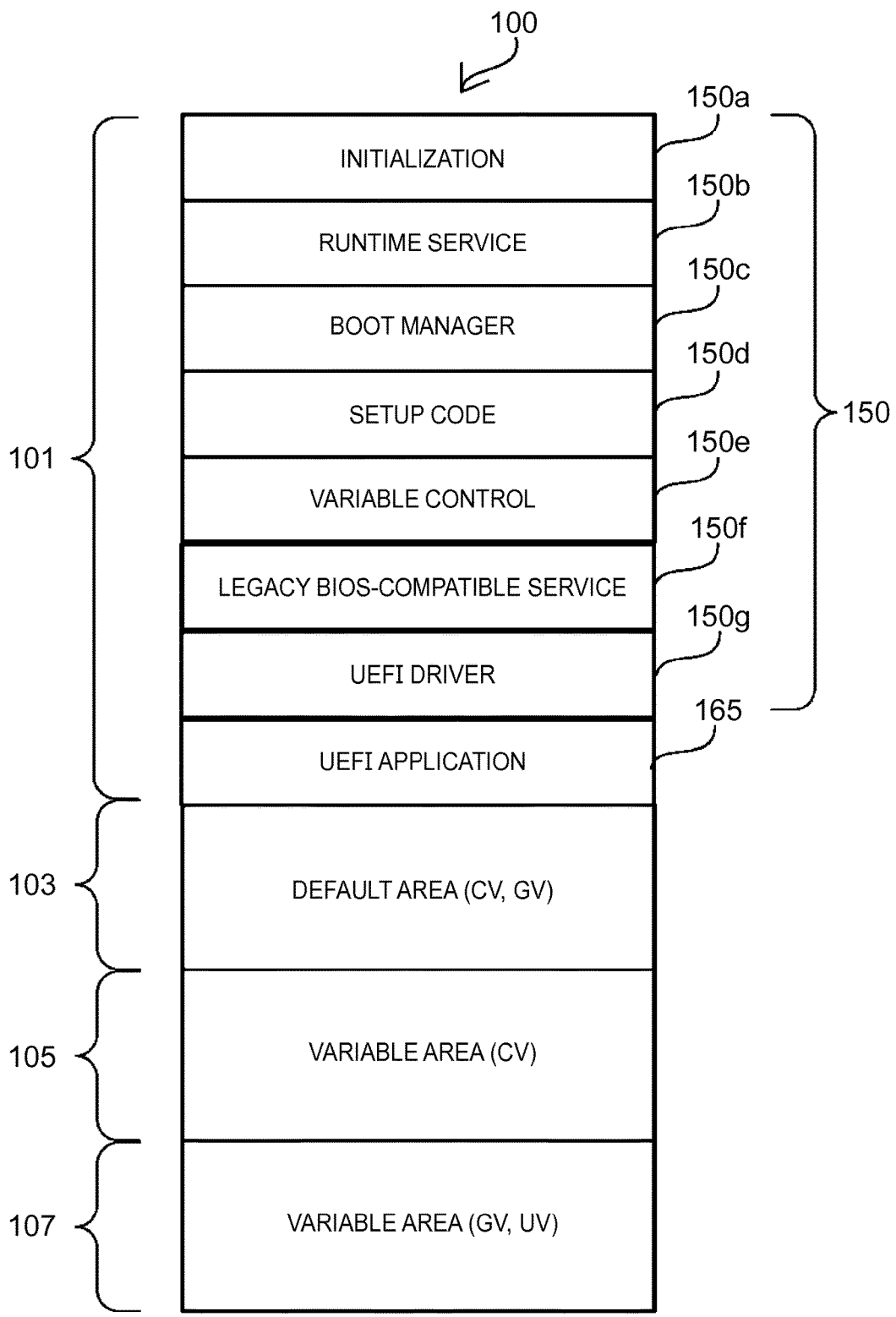
FIG. 2 is a diagram showing an example of the data structure of a firmware ROM 100.
Figure 3:
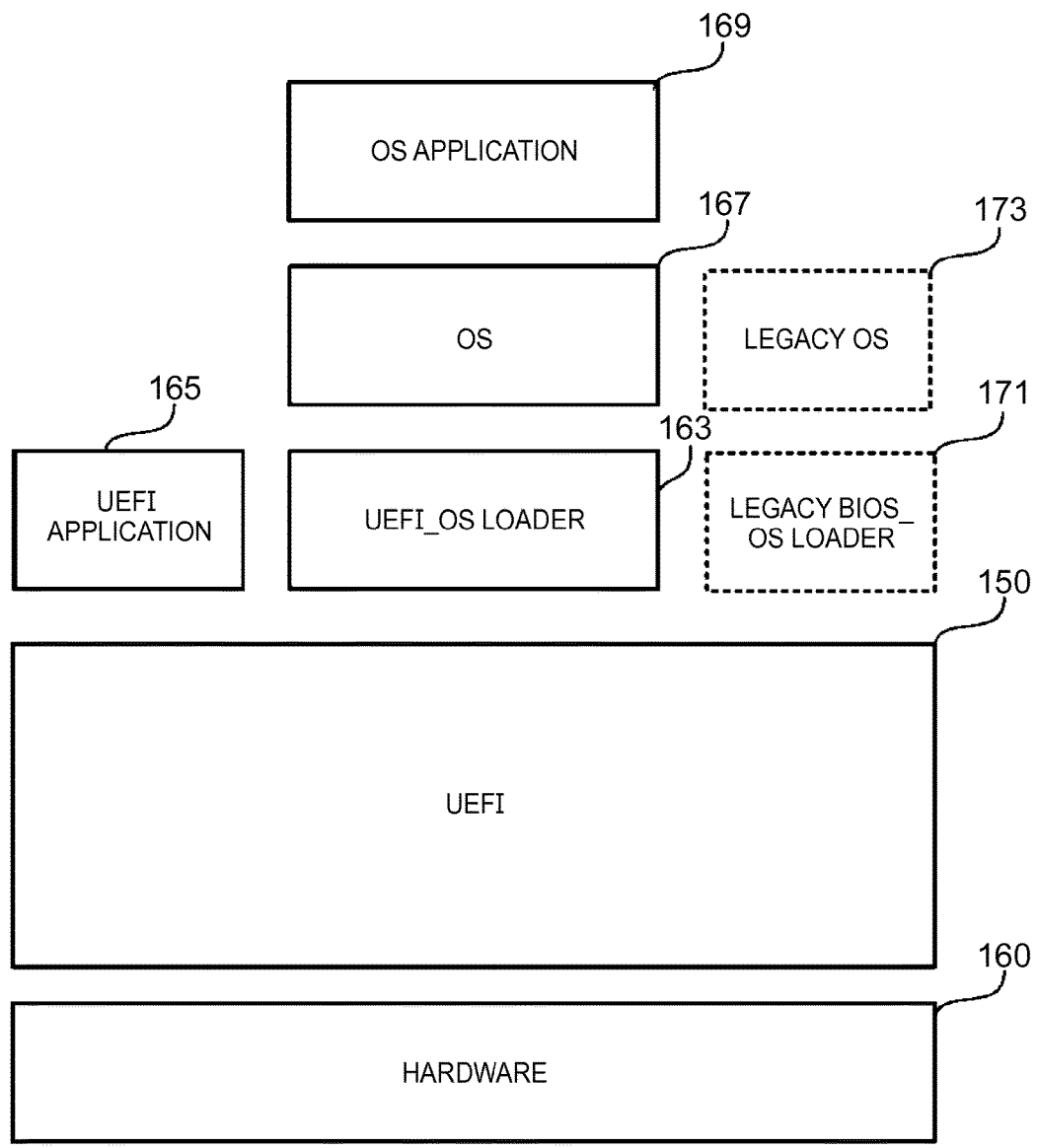
FIG. 3 is a diagram showing a hierarchy structure of software implemented by the PC 10 to be in an execution state.

FIG. 2 is a diagram showing the data structure of the firmware ROM 100, and FIG. 3 is a hierarchy structure of software loaded in the system memory 15 to be in an execution state. The firmware ROM 100 is a nonvolatile flash memory capable of electrically rewriting the memory content, and is divided into four blocks, namely a code area 101, a default area 103, and variable areas 105 and 107 as an example.

In the embodiment, recording areas that are write-lock enabled in the SPI controller of the chipset 13 are allocated to the code area 101, the default area 103, and the variable area 105. Nothing can be written to any write-locked recording area until the chipset 13 is reset. However, since the variable area 107 records GV, the rewriting of which by an OS 167 or an OS application 169 is guaranteed in the UEFI specification, the write-lock thereof is disabled.

The code area 101 stores UEFI firmware 150 and a UEFI application 165, the default area 103 stores default values of GV and CV, the variable area 105 records the latest CV, and the variable area 107 records the UV and the latest GV. The default values of the GV and the CV stored in the default area 103 are written before the shipment of the PC 10 or upon updating of the UEFI firmware 150.

The UEFI firmware 150 updates the CV in response to a change in the system operating environment. In the UEFI specification, it is defined that the GV is published to enable the UEFI application 165, the OS 167, and the OS application 169 to refer to or update the GV. Therefore, the GV and CV recorded in the variable areas 105 and 107 are initially default values, but rewritten or added while the PC 10 repeats booting. When the CV is rewritten intentionally or mistakenly by software other than the UEFI firmware 150, there is a possibility that the system cannot perform the next boot normally.

The UEFI firmware 150 includes initialization code 150a, a runtime service 150b, a boot manager 150c, setup code 150d, variable control code 150e, a legacy BIOS-compatible service 150f, and a UEFI driver 150g. The UEFI firmware 150 employs a boot block system for reducing risk associated with rewriting to set an area storing the initialization code 150a as a boot block. The code stored in the boot block cannot be rewritten because the code is treated as CRTM (Core Root of Trust Measurement) defined in the TPM specification unless there is special authority.

The CRTM is configured as a part the integrity of which is guaranteed in the platform initialization code, which must be executed first without fail at the time of resetting the platform. The CRTM is executed first without fail at the time of so-called cold boot as an operating process for the PC 10 to make a transition from the hibernation state (S4 state) or the power-off state (S5 state) to the power-on state (S0 state) defined in the ACPI.

The initialization code 150a detects, inspects, and initializes the CPU 11, the system memory 15, and other basic devices necessary to load the UEFI firmware 150 into the system memory 15 in order to start running upon cold boot of the PC 10 within a necessary range. The initialization code 150a also initializes predetermined devices, such as the controller of the chipset 13 and peripheral devices, to put the predetermined devices into a usable state during a period from when the CPU 11 is reset until control is transferred to the UEFI-OS loader 163. The initialization code 150a stops the boot when falsification is found as a result of inspecting the consistency or integrity of other code stored in the code area 101.

The runtime service 150b provides variable services, time information services, virtual memory services, and the like related to the embodiment. The boot manager 150c performs boot processing, password authentication processing, and the like. The boot manager 150c refers to the GV to load, into the system memory 15, the UEFI application 165, the UEFI driver 150g, and the UEFI-OS loader 163 (or a legacy BIOS_OS loader 171 when booting a legacy OS 173). The boot manager 150c reads the UEFI-OS loader 163 into the system memory 15 to verify the integrity immediately before control is transferred from the UEFI firmware 150 to the OS 167 after the completion of pre-boot. An electronic signature obtained by encrypting, with a private key, a hash value calculated by a creator who created them is attached to the UEFI-OS loader 163.

The boot manager 150c compares a hash value calculated from the code of the UEFI-OS loader 163 with the hash value of the electronic signature decrypted with a public key acquired from a signature database, and when they match, the boot manager 150c determines that the integrity is maintained to permit the execution of the UEFI-OS loader 163. The setup code 150d displays a setup screen on the LCD 19 when a predetermined function key on the keyboard 29 is pressed down at the pre-boot stage. The user can decide on the order of priority of boot disks, set the boot method, set devices used, set a password, configure the setting of power management, and the like through the setup screen.

The setup code 150d writes configuration information entered through the setup screen to the variable areas 105 and 107, and the other storage areas. On the other hand, the setup code 150d displays a cleanup screen to allow a user to determine whether to clean up the variable area 107 on the LCD 19 when called from the variable control code 150e. The setup code 150d performs processing for cleaning up the UV written in the variable area 107 in accordance with instructions from the user.

When the variable control code 150e finds the alteration to the parameters of GV related to the boot, the setup code 150d performs processing for restoring these parameters to the default values in accordance with instructions from the variable control code 150e. The variable control code 150e performs processing upon writing the CV, GV, and UV in the variable areas 105 and 107 in a manner to be described in procedures of FIG. 4 and FIG. 5. The legacy BIOS-compatible service 150f provides a legacy BIOS-compatible interface for the non-UEFI-compliant legacy OS 173. When the legacy OS 173 uses the legacy BIOS-compatible interface, an INT  interrupt routine is called. However, since no interrupt routine related to the variable services is included, the legacy OS 173 cannot use the variable services. Therefore, the legacy OS 173 cannot write UV in the variable area 107**.

Figure 4:
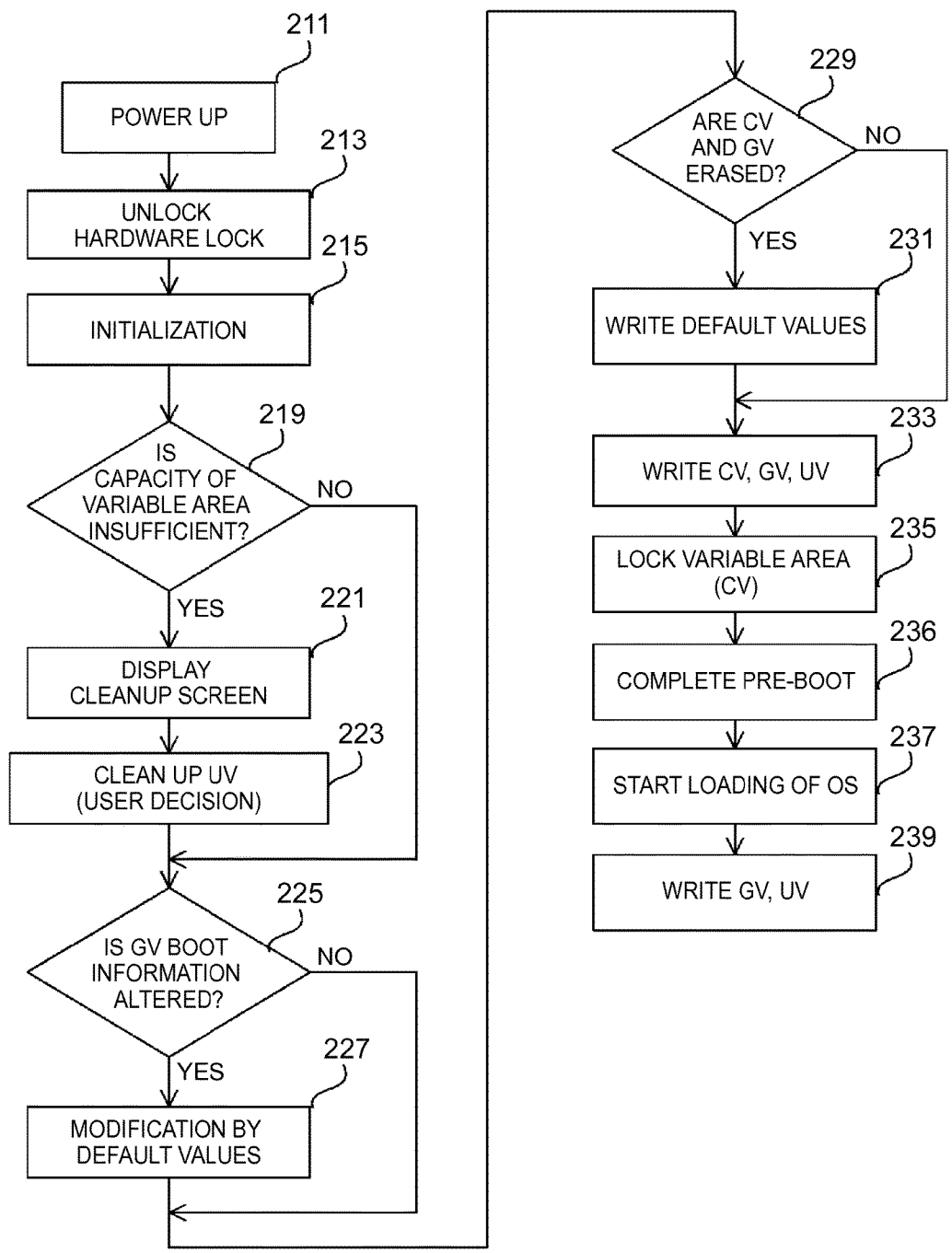
FIG. 4 is a flowchart showing a procedure in which UEFI firmware 150 controls access to variable areas.
Figure 5:
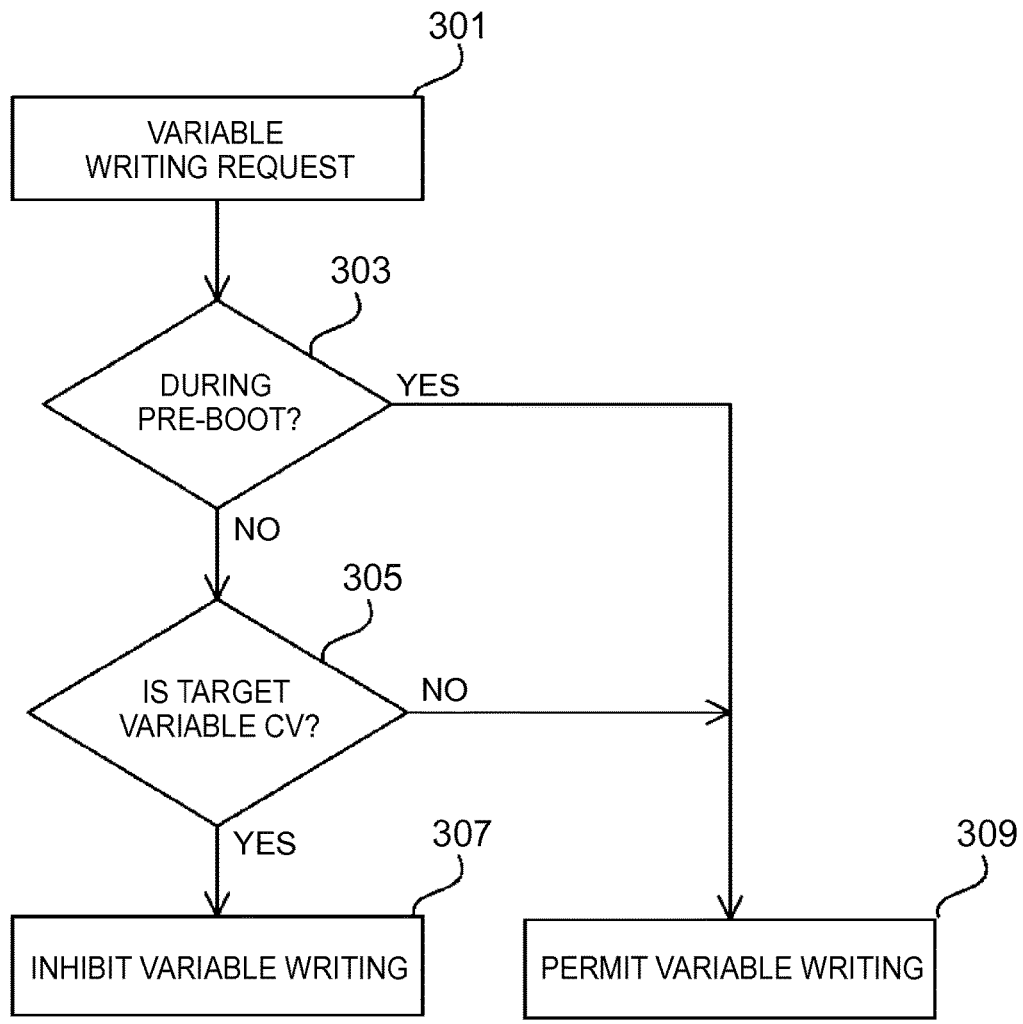
FIG. 5 is a flowchart showing a procedure in which variable control code 150e controls access to variable areas 105 and 107.
Figure 6:
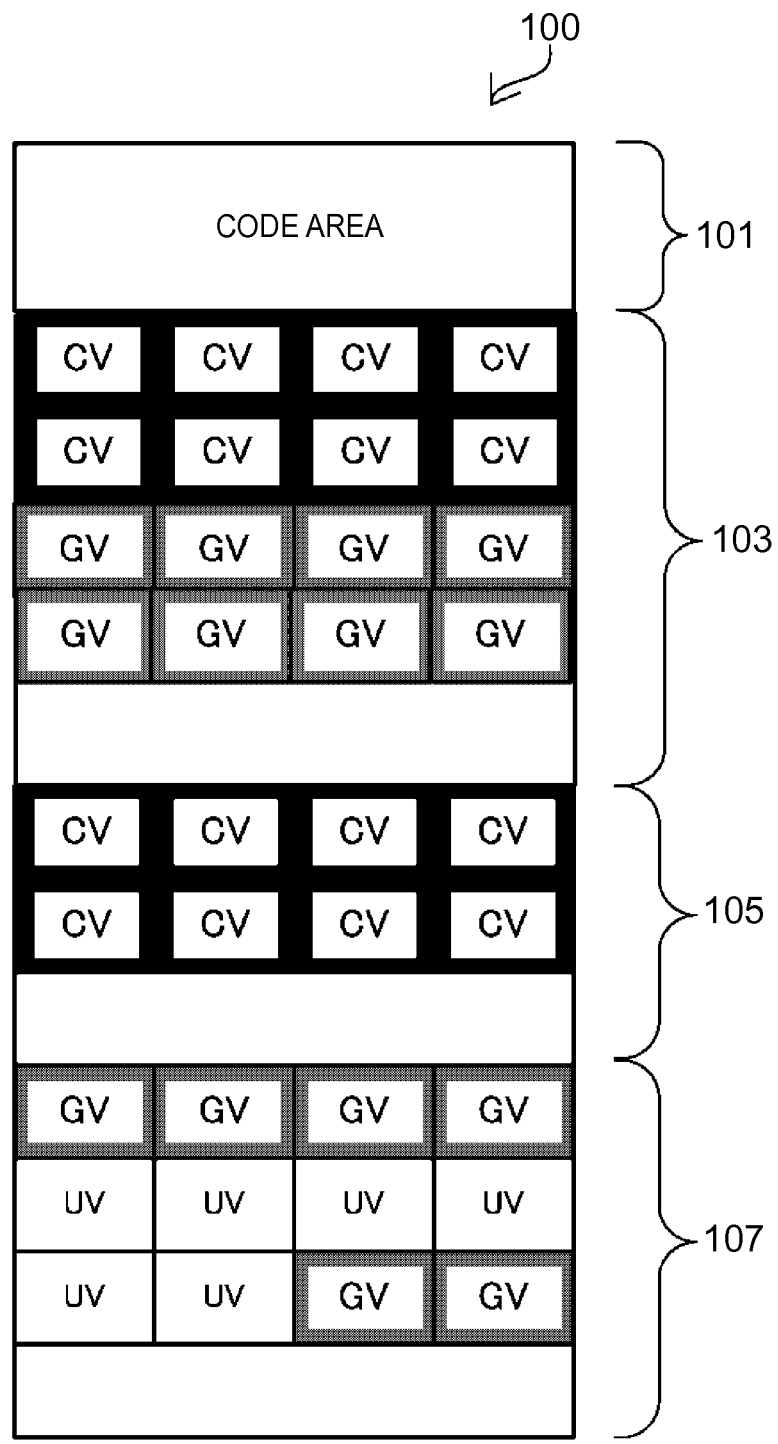
FIG. 6 is a diagram showing a state of storing variables in the firmware ROM 100.

FIG. 4 and FIG. 5 are flowcharts showing procedures in which the UEFI firmware 150 controls access to the variable areas 105 and 107. In block 211, the PC 10 is powered up to cause the system to start cold boot. At this time, as shown in FIG. 6, CV is recorded in the variable area 105, and GV and UV are recorded in the variable area 107 in a mixed state according to the order of writing. In block 213, the chipset 13 that is power-on reset unlocks the write-lock function to the code area 101, the default area 103, and the variable area 105 of the firmware ROM set in the SPI controller.

Since the write-lock to the variable area 105 is unlocked, the UEFI firmware 150 can add or update the CV to make progress on the pre-boot. Then, when the initialization code 150a initializes devices necessary for the pre-boot in block 215, the UEFI firmware 150 and the UEFI application 165 are loaded into the system memory 15. Then, the initialization code 150a refers to the CV in the variable area 105 to initialize the other devices within a necessary range.

The OS 167 may write new GV according to a change in the system. Further, the OS 167 and the UEFI application 165 may write new UV to the variable area 107. Thus, when the variable area 107 runs out of space, the UEFI firmware 150 cannot update the GV necessary for pre-boot and hence boot may be disabled. In block 219, the variable control code 150e determines whether the capacity of the variable area 107 is approaching its maximum, 90% for example.

When the variable control code 150e determines that the remaining capacity of the variable area 107 is insufficient, the procedure proceeds to block 221. In block 221, the variable control code 150e displays a cleanup screen on the LCD 19 through the setup code 150d. On the cleanup screen, it can be displayed that the capacity of the firmware ROM 100 runs out of space, there is a possibility that boot is disabled if this state continues, an operation menu for erasing all the UV, a problem arising when the UV are erased, a method of solving the problem accompanied with the erasure of the UV, and the like.

The user who looked at the cleanup screen in block 223 may clean up the UV after the backup data on the UV at the time are stored in the HDD 21, or clean up the UV after the next boot. At this time, the variable control code 150e may record, in the HDD 21, the UV to be erased to pass the path to the UV to the OS 167 so that the OS 167, the UEFI application 165, and the OS application 169 can acquire the UV later.

In the UEFI specification, since GV necessary to publish cannot be write-protected, the OS 167 and the OS application 169 have the potential to rewrite the GV by mistake. Further, the UV and GV are recorded in the same variable area 107. Therefore, when noise is generated due to instantaneous interruption of the power supply during access to the variable area 107, there is also the potential to damage the GV recorded in the variable area 107.

In block 225, the variable control code 150e determines whether parameters called load options for specifying GV by the names of Boot####, BootOrder, Drive####, DriveOrder, and Key#### related to boot in the GV recorded in the variable area 107 are changed from the default values. The load options include a list describing the paths to the boot disk and the boot image (FilePathList), and if this value is altered, boot is disabled.

The variable control code 150e compares the load options recorded in the default area 103 and the variable area 107, respectively, and when alteration is determined, the procedure proceeds to block 227. In block 227, the variable control code 150e instructs the setup code 150d to rewrite the load options for all GV related to the boot or the load options for altered GV with the default values recorded in the default area 103.

At this time, the setup code 150d can use Setup Defaults assigned to the F9 key and Save & Exit function assigned to the F10 key on the setup screen. Even if the GV related to boot is rewritten at the previous boot, since the load options for the GV related to the boot is modified as necessary during this pre-boot, at least the setup screen can be displayed. Even when a boot problem arises due to the alteration to the GV, if the setup screen can be displayed, the chance for the user to recover the problem will increase.

When the CV and GV are erased for any cause, an error indicative of the absence of data occurs when the data is referred to in GetVariable( ). In block 229, the variable control code 150e checks whether all the CV and GV recorded in the variable areas 105 and 107 exist. When determining that the CV and GV in the default area 103 are not present in the CV and GV recorded in the variable areas 105 and 107, the variable control code 150e writes, in block 231, the default values of the CV and GV erased from the variable areas 105 and 107.

Block 233 indicates that the UEFI firmware 150 or the UEFI application 165 may write CV, GV, and UV to the variable areas 105 and 107 during a period from the start to the end of pre-boot. In block 235, the variable control code 150e sets the SPI controller of the chipset 13 to write-lock the code area 101, the default area 103, and the variable area 105. Since the CV is stored in the variable area 105 write-locked in a hardware manner, the CV is neither altered by the UEFI application 165, the OS 167, or the OS application 169, nor affected by power-supply noise generated during access to the variable area 107.

Further, the variable control code 150e returns an error after that in response to a SetVariable( ) call as a function of writing CV from the UEFI application 165, the OS 167, or the OS application 169 to perform write-lock in a software manner. The software write-lock can be performed together with the hardware write-lock or instead of the hardware write-lock. Even the software write-lock can prevent the alteration to CV and the influence of power-supply noise. Note that, when only the software write-lock is adopted instead of the hardware write-lock, the UEFI firmware 150 can also be permitted to rewrite CV even after completion of pre-boot. The pre-boot is completed in block 236 following write-protect processing for the variable area 105.

In block 237, when the boot manager 150c loads the UEFI-OS loader 163 from a predetermined sector of the HDD 21, the OS 167 and the OS application 169 are loaded, the PC 10 makes a transition to the power-on state, and the system operates in the UEFI native mode. The UEFI application 165, the OS 167, and the OS application 169 can make a UV writing request freely to the UEFI firmware 150.

Block 239 indicates that the UEFI application 165, the OS 167, or the OS application 169 writes GV and UV to the variable area 107 as necessary. Since hardware lock and software lock or either of them is performed on the variable area 105, the OS 167 and the OS application 169 do not rewrite CV by mistake during writing of GV and UV. Further, even when noise is generated due to instantaneous interruption of the power supply during writing of GV and UV, the variable area 105 is not affected by the variable area 107 because the variable area 105 is separated from the variable area 107 by the hardware lock and the software lock.

The procedure shown in FIG. 4 is just illustrative example to describe the presented embodiments, and all the blocks are not necessarily essential to the procedure of the presented embodiments. The essential procedure of selected of the presented embodiments is as described in the appended claims. Further, the order of respective blocks is not also limited to the order shown in FIG. 4. For example, the procedure in blocks 219, 225, and 229 can be replaced together with associated procedures.

FIG. 5 is a flowchart for describing a procedure for performing processing when the variable control code 150e receives a request for writing CV, GV, or UV to the variable areas 105 and 107. In block 301, a request to the UEFI application 165, the OS 167, or the OS application 169 for writing any of CV, GV, and UV is issued by calling SetVariable( ) in either of blocks 233 and 239 of FIG. 4. The variable control code 150e that received the request determines in block 303 whether pre-boot is currently completed. When the pre-boot is completed, the procedure proceeds to block 305, while during pre-boot, the procedure proceeds to block 309.

In block 309, the variable control code 150e passes the writing request to the runtime service 150b even when the variables are of any type. Among variables specified in SetVariable( ), the runtime service writes CV to the variable area 105, and GV and UV to the variable area 107. In block 305, the variable control code 150e refers to the variable name (VariableName) and the vendor identifier (VendorGuid) in the parameters set in SetVariable( ) to compare them with a list previously held in order to determine the type of variables to be written.

When the variables are UV or GV, the variable control code 150e passes the request to the runtime service. When the variables are CV, the variable control code 150e invalidates the request using the software lock function. Further, when the chipset 13 is locked in a hardware manner, even if the runtime service 150b receives the request, since it cannot access the variable area 105, the CV cannot be written.

Figures 7A, 7B:
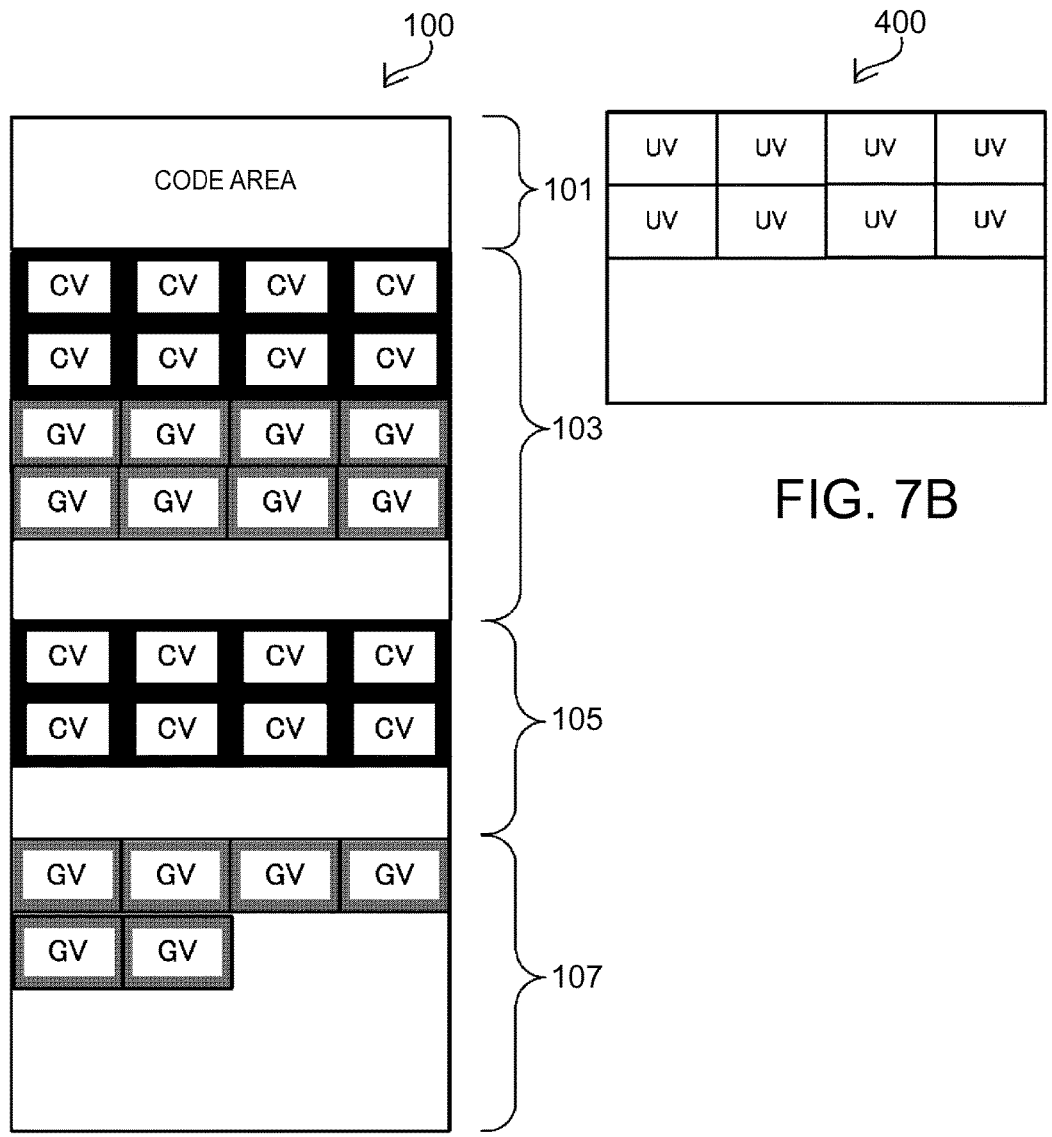
FIG. 7A and FIG. 7B is a diagram showing a state of storing variables in the firmware ROM 100 and another nonvolatile memory 400.
Figure 8:
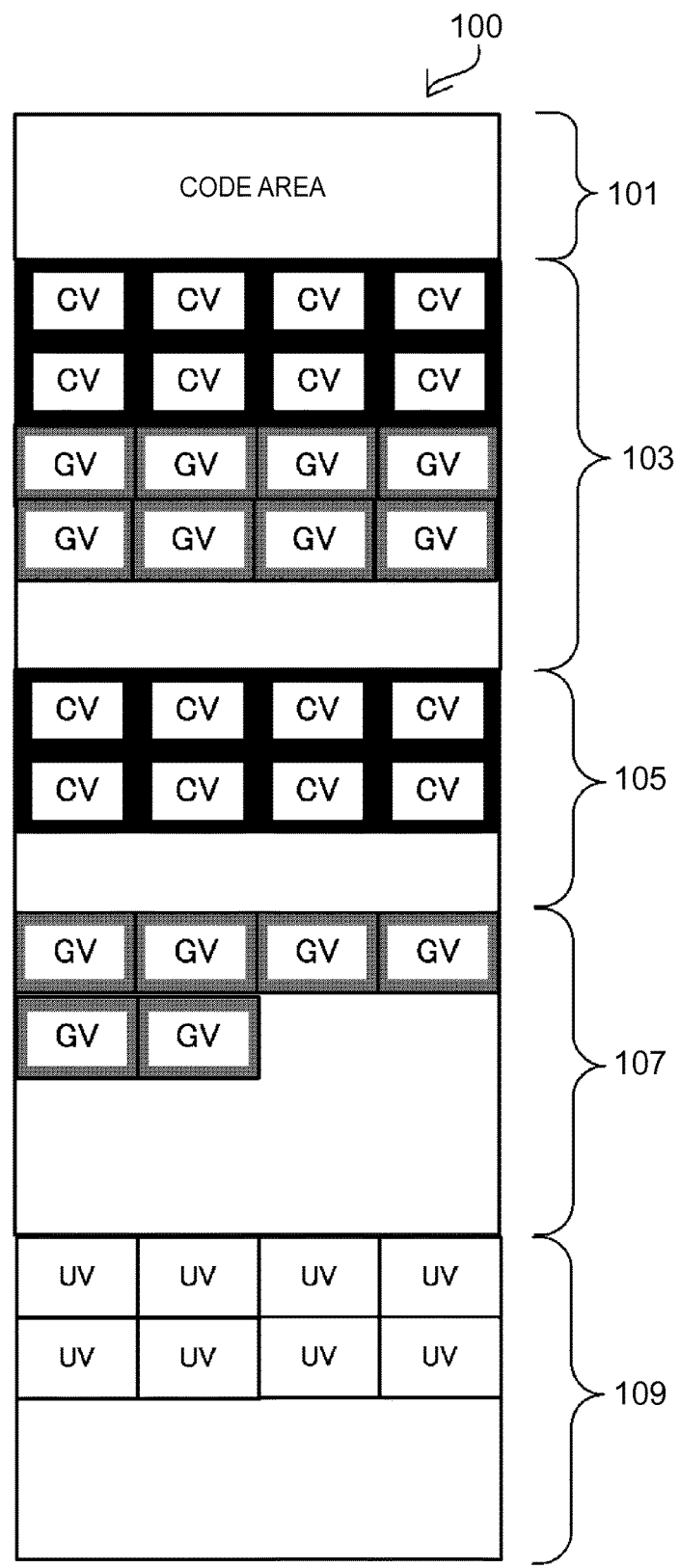
FIG. 8 is a diagram showing a state of separating between areas of the firmware ROM 100 for recording UV and GV.

FIG. 7 and FIG. 8 are diagrams for describing another configuration method of the variable areas 105 and 107. The configuration in FIG. 7 is different from the configuration in FIG. 6 only in that only GV is recorded in the variable area 107 of the firmware ROM 100 as shown in FIG. 7A and UV is recorded in another nonvolatile memory 400 different in interface as shown in FIG. 7B. This can eliminate a danger that the variable area 107 is overflowed with UV, and the risk of damaging CV and GV due to instantaneous interruption of the power supply caused during access to the nonvolatile memory 400. Note that, even in this case, the variable area 105 is kept in a hardware-locked and software-locked state, or in either of the states.

The configuration in FIG. 8 is different from the configuration in FIG. 6 only in that a variable area 109 is added to the firmware ROM 100. In the configuration of FIG. 8, only the GV is recorded in the variable area 107, and only the UV is recorded in the variable area 109. Although the variable area 105 is write-protected, the variable areas 107 and 109 are not write-protected. Even in this case, the overflow problem of the variable area 107 and the problem of the instantaneous interruption of the power supply can be solved like in the configuration of FIG. 7.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor, the code comprising:
code that writes, to a first variable area, configuration data fundamental to pre-boot;
code that writes, to the second variable area, published data defined by the system firmware to be rewritable by an operating system;
code that writes user data to the second variable area in response to a request from the operating system; and
code that restricts writing to the first variable area after completion of the pre-boot;
code that checks a remaining capacity of the second variable area during the pre-boot and displays a screen indicating that the second variable area is to be cleaned up when the remaining capacity is less than a predetermined value;
code that determines whether a rewriting request for configuration variables is during pre-boot or not;
code that processes the rewriting request when determining that the rewriting request is during the pre-boot; and
code that disables the rewriting of the configuration variables when determining that the pre-boot is completed.

2. The apparatus of claim 1, wherein the code that restricts the writing write-locks an interface controller connected to the first variable area.

3. The apparatus of claim 1, wherein the code for restricting the writing includes code for invalidating a request for updating the configuration data by the operating system.

4. The apparatus of claim 2, wherein the code for restricting the writing includes code for invalidating a request for updating the configuration data by the operating system.

5. The apparatus of claim 1, wherein the code further comprises:
code that erases the user data when an instruction for the cleanup is received.

6. The apparatus of claim 1, wherein the code further comprises:
code that recognizes a third variable area storing default values of the configuration data and the published data;
code that recognizes a third variable area storing default values of the configuration data and the published data;
code that compares the configuration data and the published data with the default values, respectively, during the pre-boot; and
code that writes the default values to the first variable area or the second variable area when it is determined that either the configuration data or the published data are erased.

7. The apparatus of claim 1, wherein the system firmware conforms to a UEFI specification and the published data are global variables defined in the UEFI specification.

8. The apparatus of claim 7, further wherein the code further comprises:
code that determines the presence or absence of alteration to parameters of global variables related to boot among the global variables recorded in the second variable area during the pre-boot; and
code that writes default values when it is determined that the parameters are altered.

9. The apparatus of claim 8, wherein the global variables related to the boot are Boot####, BootOrder, Drive####, DriveOrder, and Key####.

10. The apparatus of claim 7, wherein the operating system runs in a UEFI native mode in accordance with the UEFI specification.

11. The apparatus of claim 1, wherein the code further comprises code that processes a rewriting request for the global variables and the user variables when determining that the pre-boot is completed.

12. A method comprising:
writing, by use of a processor, to a first storage area of a nonvolatile memory, configuration variables fundamental to pre-boot;
writing, to a second storage area of the nonvolatile memory, global variables defined in a UEFI specification;
writing, to a third storage area of the nonvolatile memory, user variables in response to a request received from an operating system corresponding to the UEFI specification; and
restricting access from the operating system to the first storage area after completion of the pre-boot;
checking a remaining capacity of the second variable area during the pre-boot and displaying a screen indicating that the second variable area is to be cleaned up when the remaining capacity is less than a predetermined value;
determining whether a rewriting request for configuration variables is during pre-boot or not;
processing the rewriting request when determining that the rewriting request is during the pre-boot; and
disabling the rewriting of the configuration variables when it is determined that the pre-boot is completed.

13. The method of claim 12, wherein the code that restricts the writing write-locks an interface controller connected to the first variable area.

14. The method of claim 12, wherein restricting the writing includes invalidating a request for updating the configuration data by the operating system.

15. The method of claim 12, further comprising:
checking a remaining capacity of the second variable area during the pre-boot;
displaying a screen indicating that the second variable area is to be cleaned up when the remaining capacity is less than a predetermined value; and
erasing the user data when an instruction for the cleanup is received.

16. The method of claim 12, further comprising:
recognizing a third variable area storing default values of the configuration data and the published data;
comparing the configuration data and the published data with the default values, respectively, during the pre-boot; and
writing the default values to the first variable area or the second variable area when it is determined that either the configuration data or the published data are erased.

17. A system comprising:
a processor;
a disk drive storing an operating system conforming to a UEFI specification;
a nonvolatile memory storing UEFI code, the nonvolatile memory comprising:
a first recording area for writing configuration data fundamental to pre-boot;
a second recording area for writing data defined in the UEFI specification and user data created by the operating system; and
a memory that stores code executable by the processor, the code comprising code for restricting writing from the operating system to the first recording area after completion of the pre-boot;
the code executable by the processor further comprising code for:
checking a remaining capacity of the second variable area during the pre-boot and displaying a screen indicating that the second variable area is to be cleaned up when the remaining capacity is less than a predetermined value;
determining alteration to parameters of global variables related to boot among the global variables recorded in the second variable area during the pre-boot and writes default values of the configuration data and the published data;
determining whether a rewriting request for configuration variables is during pre-boot or not;
processing the rewriting request when it is determined that the rewriting request is during the pre-boot; and
disabling the rewriting of the configuration variables when it is determined that the pre-boot is completed.

18. The system of claim 17, wherein the code for restricting the writing resides at least partially in an interface controller for the nonvolatile memory.

19. The system of claim 18, wherein the second recording area is divided into a recording area of data defined in the UEFI specification and a recording area of the user data.

* * * * *